United States Patent [19]
Walton et al.

[11] Patent Number: 5,927,002
[45] Date of Patent: Jul. 27, 1999

[54] HOLDER FOR DISPLAYING, AS WELL AS A METHOD FOR MAKING, A FLORAL BOUQUET

[75] Inventors: Charles F. Walton, Hudson, Ohio; René Silva, San Pedro, Mexico

[73] Assignee: Smithers-Oasis Company, Cuyahoga Falls, Ohio

[21] Appl. No.: 09/108,657

[22] Filed: Jul. 1, 1998

Related U.S. Application Data

[62] Division of application No. 08/736,366, Oct. 23, 1996, Pat. No. 5,776,305, which is a continuation of application No. 08/489,332, Jun. 12, 1995, abandoned.

[51] Int. Cl.$^6$ ...................................................... A01G 5/00
[52] U.S. Cl. .......................... 47/41.12; 47/41.1; 47/41.13; 47/41.15
[58] Field of Search ................................ 47/41.01, 41.11, 47/41.12, 41.13, 64, 72, 73

[56] References Cited

U.S. PATENT DOCUMENTS

| | | | |
|---|---|---|---|
| 1,655,731 | 1/1928 | May, Jr. et al. | 47/41.01 |
| 2,307,286 | 1/1943 | Matignon | 47/41.01 |
| 2,656,969 | 10/1953 | Kvasnok et al. | 41/41.01 |
| 2,765,585 | 10/1956 | Smithers | 47/41 |
| 3,245,175 | 4/1966 | Kilngberg | 47/41.01 |
| 3,336,697 | 8/1967 | Davis | 41/41.01 |
| 4,014,506 | 3/1977 | Hanson | 248/311.1 |
| 4,678,150 | 7/1987 | Newman et al. | 248/205.3 |
| 4,941,572 | 7/1990 | Harris | 206/423 |
| 5,317,832 | 6/1994 | Kollen | 47/41.12 |
| 5,469,654 | 11/1995 | Thompson | 47/41.12 |
| 5,507,116 | 4/1996 | Gao | 47/18 |
| 5,557,886 | 9/1996 | Whitcomb | 47/73 |
| 5,704,108 | 1/1998 | Weder | 29/469.5 |

FOREIGN PATENT DOCUMENTS

| | | | |
|---|---|---|---|
| 2629983 | 10/1989 | France | 47/41.01 |
| 2682023 | 4/1992 | France | 47/41.01 |
| 137012 | 8/1984 | Japan | 47/41.01 |
| 406078845 | 3/1994 | Japan | 47/41.01 |
| 93/02600 | 8/1994 | WIPO | 47/41.01 |

OTHER PUBLICATIONS

Cassell's Household Guide, "The Water Bouquet", p. 225, Mar. 1881.

*Primary Examiner*—Michael J. Carone
*Assistant Examiner*—Fredrick T. French, III
*Attorney, Agent, or Firm*—Renner, Kenner, Greive Bobak, Taylor & Weber

[57] ABSTRACT

A transportable floral holder in the nature of a wettable floral foam mass received within a water impervious shell, or sheath. The floral foam mass serves as a reservoir as well as a coupling device. The shell not only circumscribes the floral foam reservoir but also has oppositely disposed, open first and second ends. The open first end serves primarily to permit the cut stem bearing buds, blossoms and/or leaves to be inserted into a first implanting area of the floral foam mass so that the cut stem is provided with access to moisture that will extend the life of the attached buds, blossoms and/or leaves. The oppositely directed second open end of the shell primarily permits a bare cut stem to be inserted into a second implanting area of the floral foam mass, thereby allowing the shell encased floral foam mass to serve as a coupler that camouflages the fact that the stems have been cut so that the overall appearance of the floral presentation simulates an uncut, long stemmed bouquet in the nature of a sheaf that one can carry, or support, across the crook of an arm.

11 Claims, 5 Drawing Sheets

HOLDER FOR DISPLAYING, AS WELL AS A METHOD FOR MAKING, A FLORAL BOUQUET

This application is a Division of Ser. No. 08/736,366 Oct. 23, 1996 U.S. Pat. No. 5776305 which is a continuation of Ser. No. 08/489,332 Jun. 12, 1995, abandoned.

TECHNICAL FIELD

The present invention relates generally to floral bouquets. More particularly, the present invention relates to floral holders filled with floral foam that allows a floral bouquet to be presented as though the flowers were a bound sheath. Specifically, the present invention relates to foam filled bouquets that are truly couplers in that the opposed ends of the holder are open to receive the cut stems of flowers in such a manner that the overall appearance of the floral bouquet emulates cut, long stemmed flowers that are merely secured in the configuration of a sheaf by the structure of the holder at what appears generally to be the medial portion of the stems. This invention is also directed to a unique method for making the aforesaid floral bouquets.

BACKGROUND OF THE INVENTION

To impart an extended period of time during which cut flowers may appear fresh, the stems of the cut flowers are most frequently insertably received in, and supported by, a floral foam material such as the premier product marketed under the trade mark Oasis. Such floral foam material is capable of retaining and supplying moisture to the cut flower stems so that any buds, blossoms, leaves and even the stems themselves will remain fresh for extended periods of time. The moisture can, therefore, well be water with or without chemical additives to extend the life of the flowers. The use of the floral foam material also inhibits spillage. Because Oasis floral foam will retain the desired fluid without spillage, bouquets, or other displays, using such foam frequently do not require a container, although when a container is employed, the container will have side walls and a base wall that are impervious to the passage of liquid—primarily water.

One such foam filled container for presenting a floral arrangement is disclosed in U.S. Pat. No. 5,469,654 which issued on Nov. 28, 1995. That patent discloses a cut flower container having a shell that is water impervious and which surrounds the floral foam on the vertical sides as well as the bottom thereof. At least a portion of the top side remains open to facilitate receiving the stems of the flowers that comprise the floral arrangement. As will become apparent, that container does not have a structural configuration which lends itself to providing a bouquet in the nature of a floral sheaf.

With the foregoing introduction serving as a general background, attention may now be given to the considerations that led to the present invention. Historically, brides, and even their attendants, would carry a floral "sheaf"—i.e., a plurality of long stemmed, cut flowers that would be carried, or supported, in the crook of the arm. Quite often the stems of the flowers assembled as a sheaf were wrapped in tissue paper, generally a waxed tissue paper that was often green. In addition, a ribbon was often tied in a bow to embrace the medial portions of the long stems wrapped in the tissue paper and thereby hold the sheaf together. Many florists would also use a foil that could be molded by hand to conform to the exterior disposition of the stems. The foil was capable of being used alone but more commonly it was used in combination with waxed tissue and perhaps a ribbon tied with a bow.

As beautiful and as traditional as the floral sheaf has historically been, the use of floral sheaves has fallen into disfavor primarily because fresh cut flowers, even those that have been "hardened," will begin noticeably to wilt after only a few hours—and particularly in warm or hot weather—without continuous access to water. The short life one expects from a floral sheaf has been a major contributing factor in the replacement of floral sheaves with bouquets of relatively short stemmed flowers inserted in floral foam which serves to extend the life of the flowers. Relatively short stemmed flowers inserted in a floral foam such as the aforementioned Oasis brand foam which can, in turn, be supported in a cage that may be hand held. A representative support using such floral foam is depicted in U.S. Pat. No. 2,765,585 issued on Oct. 9, 1956, to the assignee of the subject invention.

Whenever floral foam can be used, the flowers will maintain their fresh appearance for time periods measured in days rather than hours, but it has, heretofore, been highly impractical to use floral foam with sheaf-like floral bouquets. Even a relatively small mass of floral foam at the end of a long stem detracts from the desired appearance of a sheaf, and such use of a floral foam makes it awkward to carry and virtually impossible to camouflage.

SUMMARY OF THE INVENTION

It is, therefore, a primary object of the present invention to provide a new and novel floral bouquet.

It is another object of the present invention to provide a new and novel floral bouquet, as above, that fully simulates an assemblage of long stemmed flowers and wherein the stems remain unsupported at their distal ends.

It is a further object of the present invention to provide a new and novel floral bouquet, as above, that emulates long stemmed flowers which may be carried as a sheaf while affording extended life for the flowers.

It is a still further object of the present invention to provide a new and novel "holder" for achieving a floral bouquet, as above, wherein the unique water-impervious holder presents a first, or upper, open end through which to access a surface of the floral foam with which the holder is filled and into which at least flower stems can be inserted—the holder also presents a second, or lower, open end through which to access another surface of the foam into which at least bare flower stems can be inserted such that the overall impression is that the flowers have continuously extending, and longer, stems than they actually have.

It is yet another object of the present invention to provide a new and novel method for making a sheaf-like floral bouquet.

These and other objects of the invention, as well as the advantages thereof over existing and prior art forms, which will be apparent in view of the following detailed specification, are accomplished by means hereinafter described and claimed.

At least one or more of the foregoing objects, together with the advantages thereof over the known prior art relating to foam filled floral containers, and even holders, which shall become apparent from the specification which follows, are accomplished by the invention as hereinafter described and claimed.

In general, a floral holder embodying the concepts of the present invention utilizes a moisture impervious shell having a first open end and a second open end. A foam mass having a first foam end and a second foam end is received within the shell. The first foam end substantially fills the first, open end of the shell, and the second foam end substantially fills the second, open end of the shell. The first foam end presents a first implanting area primarily for receiving stems to which the flower buds, blossoms and/or leaves remain attached. The second foam end presents a second implanting area primarily for receiving bare cut stems.

The present invention is also directed to a method for manufacturing a floral bouquet according to which one provides a floral bouquet holder having a moisture impervious shell, an inner volume of a moisture carrying foam mass, a first implanting area and a second implanting area. One then implants primarily that portion of a floral bouquet including the buds, blossoms and leaf portions of flowers in the first implanting area, and implants primarily that portion of the floral bouquet including the generally bare flower stems in the second implanting area.

To acquaint persons skilled in the arts most closely related to the present invention, one preferred and three alternative embodiments of a floral holder that illustrate the best modes now contemplated for putting the invention into practice are described herein by, and with reference to, the annexed drawings that form a part of the specification. The method by which such a floral bouquet may be fabricated is also disclosed herein.

The exemplary floral holder, and the method for making the specific style of a floral bouquet, are described in detail without attempting to show all of the various forms and modification in which the invention might be embodied. As such, the embodiments, including the method, shown and described herein are illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
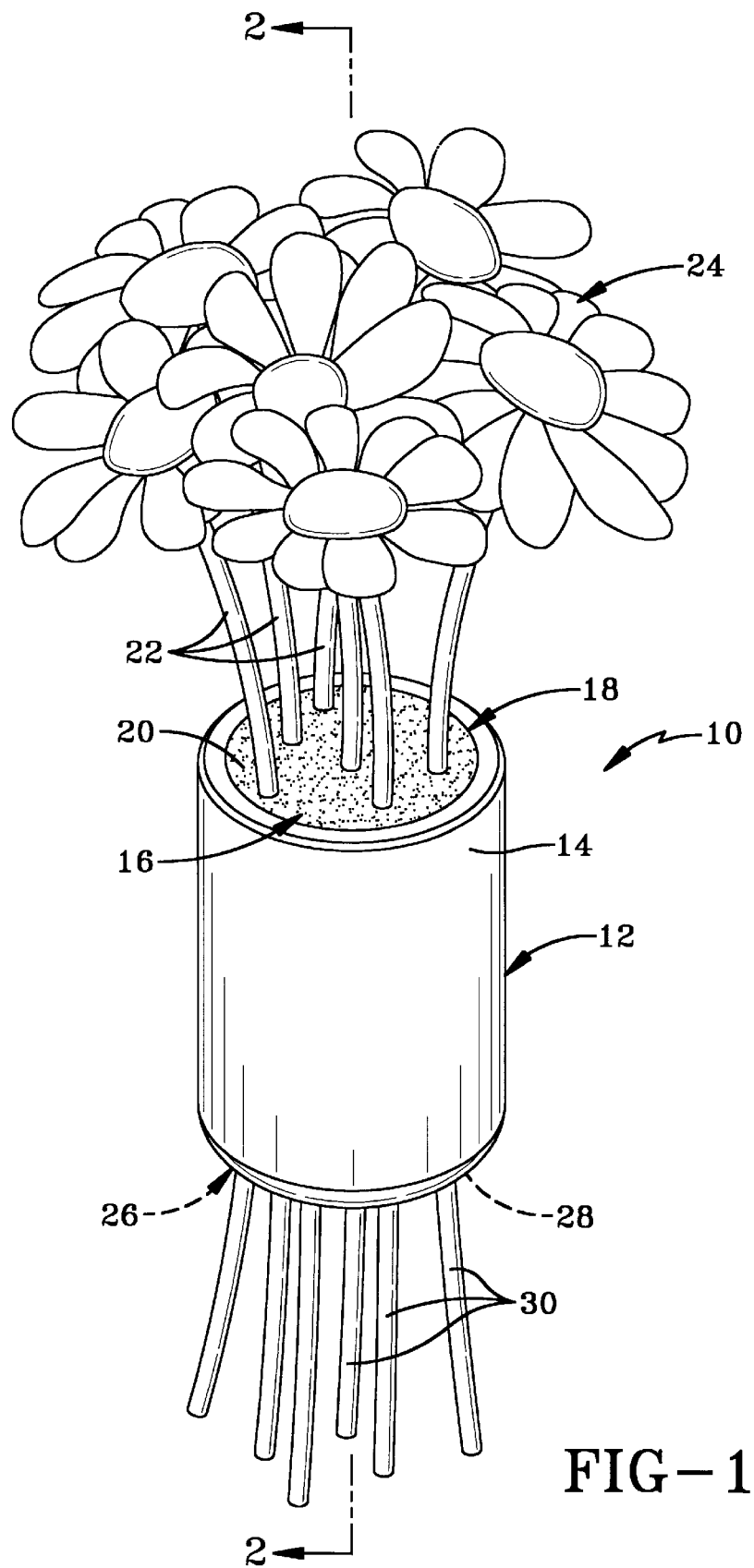
FIG. 1 is a perspective view, taken from a slightly elevated coign of vantage, of a floral bouquet incorporating one embodiment of the present invention.
Figure 2:
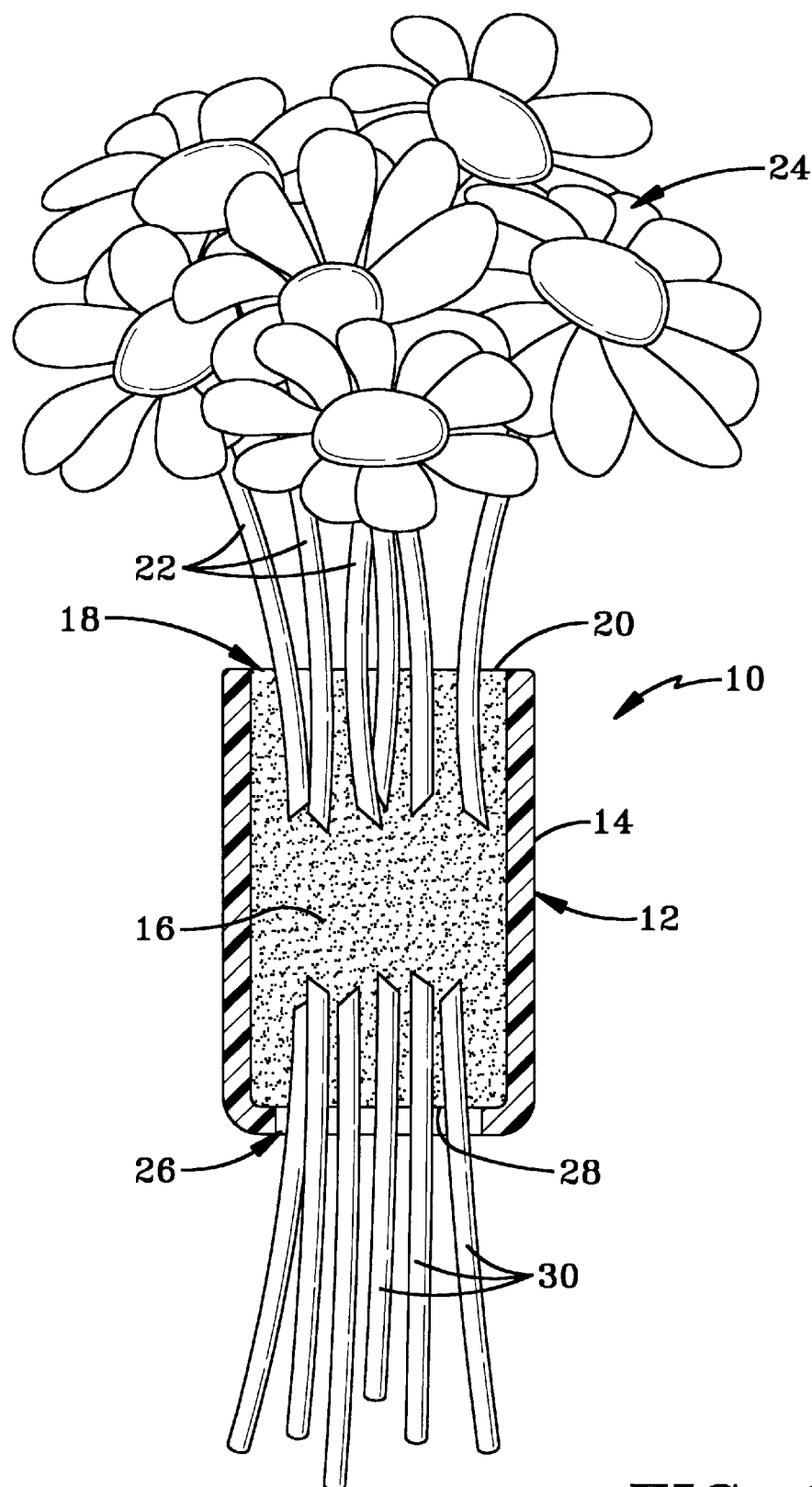
FIG. 2 is a longitudinal section taken substantially as shown along line 2—2 of FIG. 1.

One representative form of a sheaf-like floral bouquet incorporating a holder/coupler embodying the concepts of the present invention is depicted in FIGS. 1 and 2 of the accompanying drawings. The floral bouquet is designated generally by the numeral 10, and the unique holder/coupler (hereinafter simply the "holder") is designated generally by the numeral 12. As the structure of the holder 12 is described, it must be remembered that the resulting floral bouquet 10 simulates long stem flowers arranged as a sheaf that may be readily carried, or supported, in the crook of the arm of the person carrying the floral bouquet 10.

Accordingly, the holder 12 comprises a water-impervious outer shell 14 that circumscribes a compatible piece, or mass, of floral foam 16. The shell 14 is preferably a semi-rigid plastic member, and the floral foam mass 16 that at least substantially fills the interior of the shell 14 is preferably Oasis brand floral foam. The hereinafter more fully described holder 12 camouflages not only the fact that a water reservoir is contained therein but also the fact that the stems do not extend in unbroken continuity through the holder 12.

With more particular reference to FIG. 2, the shell 14 has a first, or upper, open end 18 such that the floral foam mass 16 encapsulated interiorly of the shell 14 presents a first implanting area 20 to the atmosphere through the first open end 18 of the shell 14. The implanting area 20 is intended primarily to receive a plurality of those portions of the stems 22 from which the buds, blossoms and/or leaves (collectively designated by the numeral 24) emanate. With the floral foam mass 16 having been wetted to provide a reservoir of water, to which, perhaps, some floral preservative may have been added, it will be apparent that the stems 22 insertably received within the floral foam mass 16 within the holder 12 will be able to supply the sundry portions 24 of the flower presented from each stem 22 with the necessary fluid to sustain the desired freshness of the flower. It must be understood that the length of the stems 22, as depicted, does not appear to have the graceful length one might expect from a sheaf, but the relative length of the stem 22 vis-a-vis the length of the holder and the size of the blossoms 24 are not intended to be dimensionally accurate inasmuch as the size of the holder 12 had to be at least slightly exaggerated in order conveniently to apply the numerical designations and the lead lines in such a way as to designate the structure identified thereby with the greatest clarity.

The shell 14 also has a second, or lower, open end 26 such that the floral foam mass 16 encapsulated interiorly of the shell 14 presents a second implanting area 28 to the atmosphere through the second open end 26 of the shell 14. The implanting area 28 is intended primarily to receive a plurality of those typically bare stem portions 30 that had been cut from the stems 22. To prepare a sheaf-like floral bouquet 10, the long stems of the flowers utilized in the floral bouquet 10 are severed at a selected location—typically medially of the uncut flowers stems—to present portions 22 from which the buds, blossoms and/or leaves 24 are presented and portions 30 that will generally be bare. Here, too, the length of the stems 30 may be dimensionally longer than represented—and for the same reasons heretofore mentioned with respect to the length of the stems 22 relative to the length of the holder 12.

When all the desired stems 22 and 30 are inserted within the floral foam mass 16 the resulting floral bouquet 10 appears to incorporate long stem flowers, the stems of which appear to penetrate the holder 12 (as viewed in FIG. 1) in unbroken continuity but which, as clearly depicted in FIG. 2, do not. Hence, the floral foam mass 16 encased within the shell 14 serves as a coupler which camouflages the fact that the stems have been cut (into portions 22 and 30) so that the overall appearance of the floral bouquet 10 simulates uncut, long stemmed flowers arranged in the nature of a sheaf that one can readily carry, or support, across the crook of an arm.

It should also be understood that the first and second implanting areas 20 and 28 are not limited to receiving only the specific stems 22 or 30 described. Certainly, a floral arranger may insert ends of a wide variety of "greenery" into either implanting area. Typically, therefore, fern fronds, leaves, dried materials and other decorative items may well be included in either the first or the second implanting areas 20 and 28.

Figure 3:
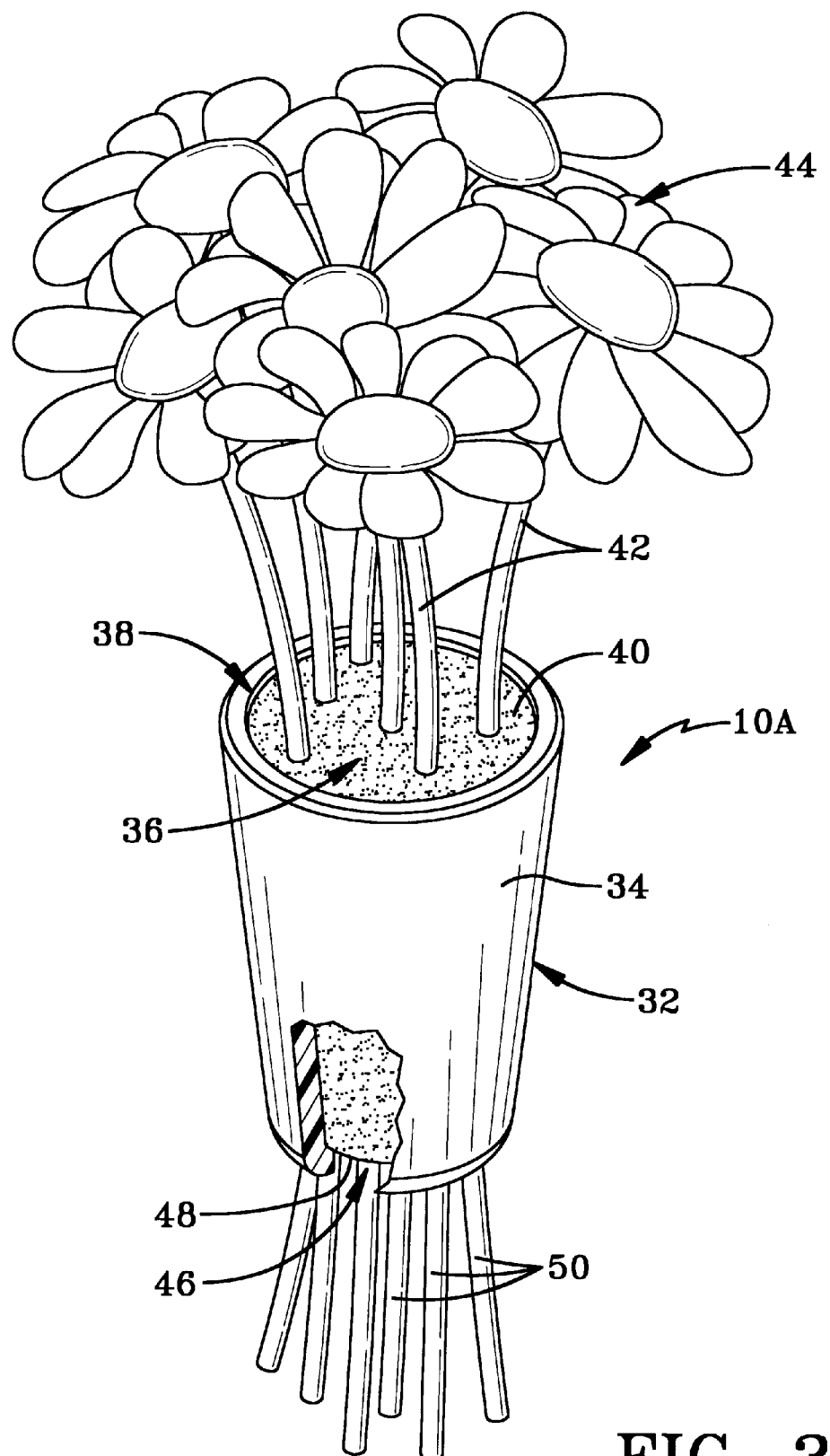
FIG. 3 is also a perspective view, taken from a slightly elevated coign of vantage and partially broken away, of a floral bouquet incorporating a first alternative embodiment of the present invention.

A first alternative floral bouquet 10A shown in FIG. 3 also employs a holder/coupler 32 (hereinafter also simply the "holder")—in this embodiment a frusto-conical shell 34, the interior of which may also be substantially filled with a mass of floral foam 36. The shell 34 also has a first, or upper, open end 38 such that the floral foam mass 36 encapsulated interiorly of the shell 34 presents a first implanting area 40 to the atmosphere through the first open end 38 of the shell 34. Here, too, the implanting area 40 is intended primarily to receive a plurality of those portions of the stems 42 from which the buds, blossoms and/or leaves (collectively designated by the numeral 44) emanate.

The alternative shell 34 also has a second, or lower, open end 46 such that the floral foam 36 encapsulated interiorly of the shell 34 presents a second implanting area 48 to the atmosphere through the second open end 46 of the shell 34. The implanting area 48 is intended primarily to receive a plurality of those typically bare stem portions 50 that had been cut from the stems 42. The first, open end 38 is of larger diameter than the second, open end 46 and for that reason the floral foam mass 36 has a larger, exposed, first implanting area 40 than the second, implanting area 48. Other than the size of the two implanting areas 40 and 48 resulting from the conical shape of the shell 34, the floral bouquet 10A depicted in FIG. 3 permits the facile fashioning of a substantially identical appearing bouquet to that shown and described as the floral bouquet 10 in FIG. 1.

Figure 4:
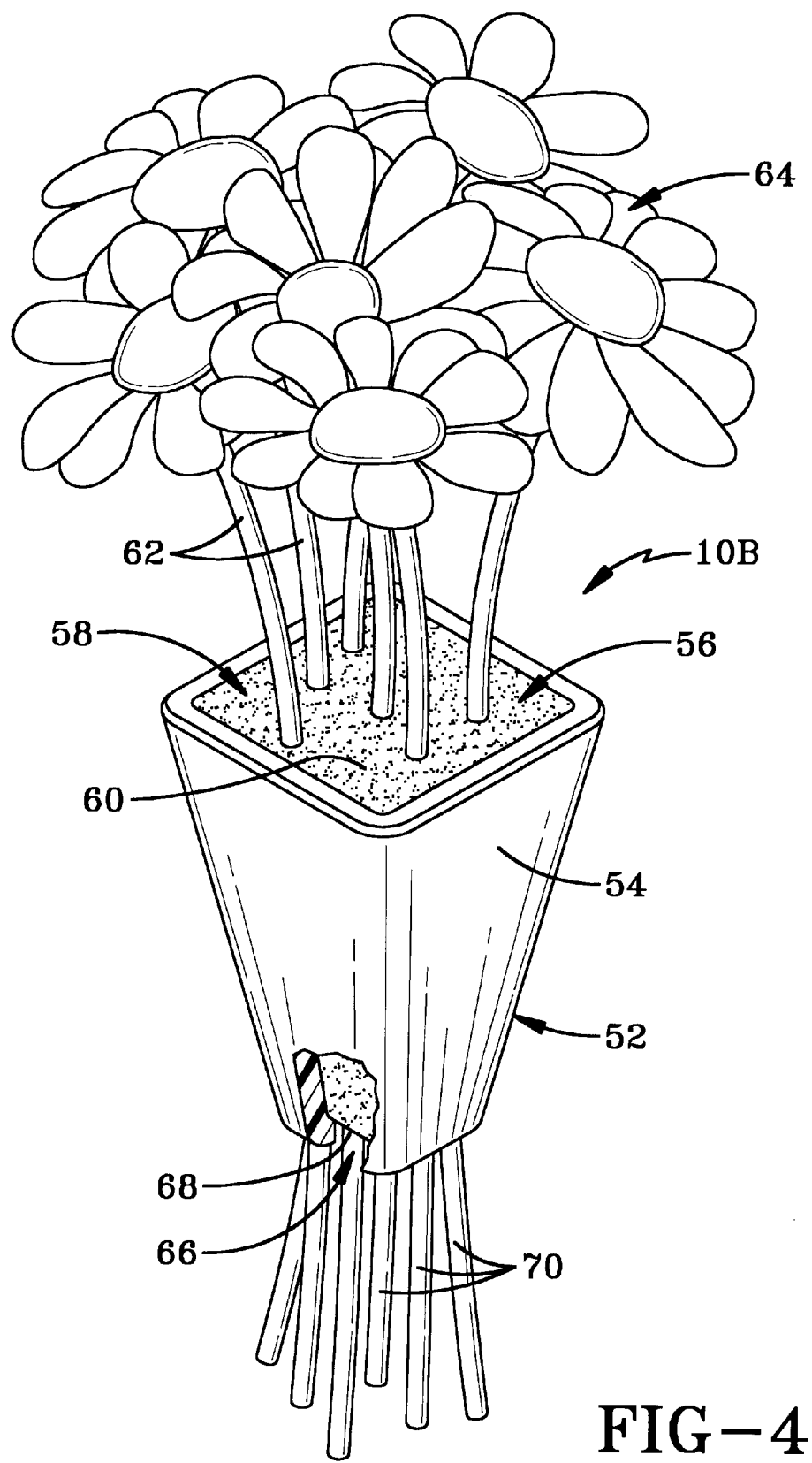
FIG. 4 is also a perspective view, taken from a slightly elevated coign of vantage and partially broken away, of a floral bouquet incorporating a second alternative embodiment of the present invention; and, FIG. 5 is also a perspective view, taken from a slightly elevated coign of vantage and partially broken away, of a floral bouquet incorporating a third alternative embodiment of the present invention.

Yet a third floral bouquet 10B shown in FIG. 4 utilizes a holder 52 that differs in that the shell 54, while also hollow, is in the shape of the frustum of a pyramid, and it too houses a mass of floral foam 56 that substantially fills the shell 54. The shell 54 also has a first, or upper, end 58 through which one has access to a first implanting area 60 on the floral foam mass 56 within shell 54 to receive those portions of the stems 62 from which the buds, blossoms and/or leaves (collectively 64) emanate. The second, or lower, open end 66 of the shell 54 similarly permits access to a second implanting area 68 on the floral foam mass 56 contained within the shell 54 that is intended primarily to receive a plurality of the typically bare stem portions 70. The implanting area 60 accessible in holder 52 is larger than the implanting area 68. However, similarly to holder 10A (FIG. 3), the holder 10B (FIG. 4) is functionally the same as the holder 10 depicted in FIGS. 1 and 2.

Figure 5:
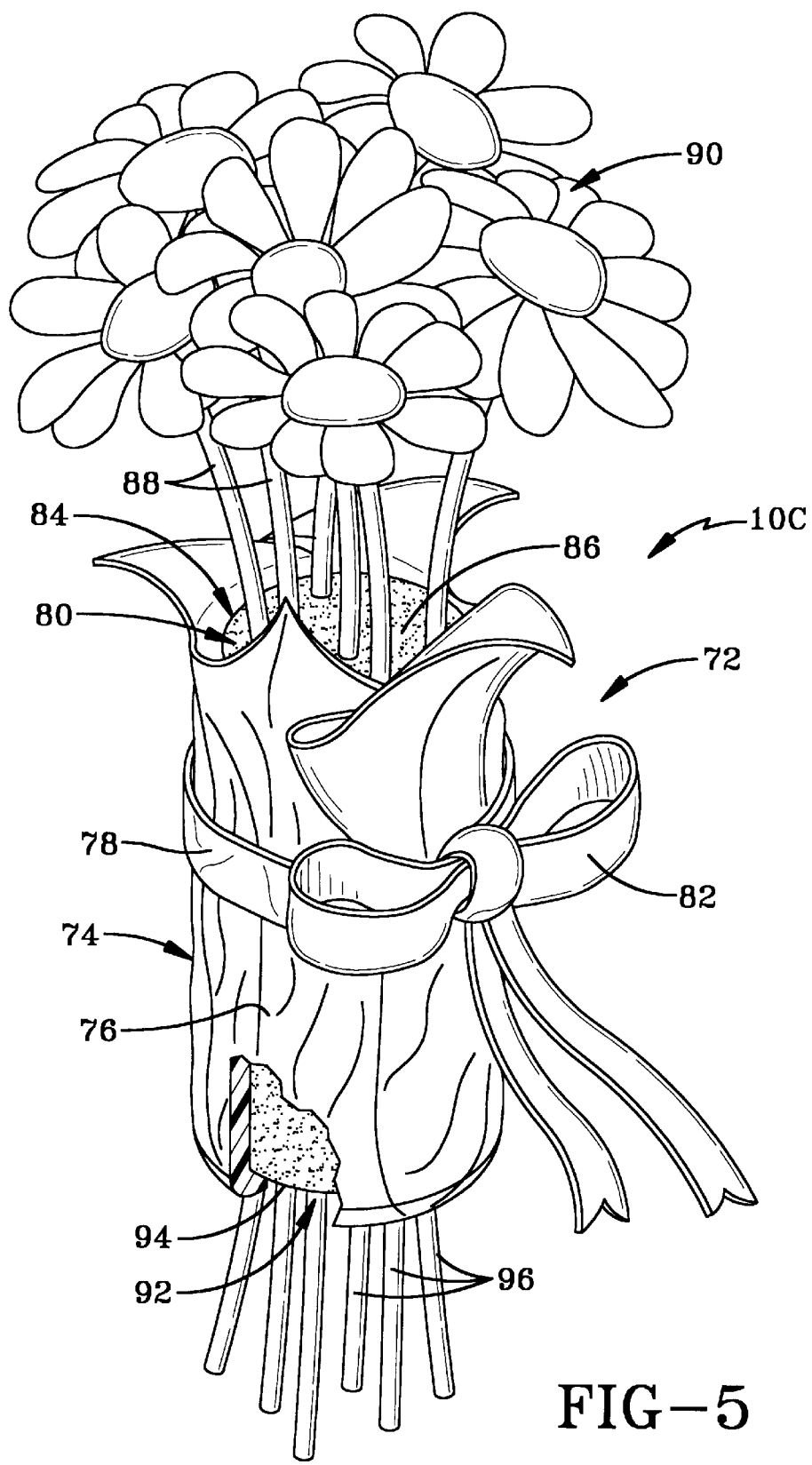

The floral bouquet 10C depicted in FIG. 5 is yet a further alternative which utilizes a holder 72 that differs from the previously described alternative configurations in that the shell 74, which is also hollow, is generally amorphous in its exterior appearance. That is, the exterior surface 76 of the shell 74 may be fabricated to simulate a conforming fabric, lace or foil cover, or the shell 74 may be sufficiently flexible that it can be circumscribed by a ribbon 78 which, when tightened, folds the shell 74 about the floral foam mass 80 as though it was actually a fabric, lace or foil sheath and then the ribbon 78 may be tied in a bow 82. It should be appreciated that actual fabric, lace and/or foil and ribbon may be employed to decorate any other holder configuration embodying the concepts of the present invention in order to present a configuration similar to that depicted in FIG. 5. Otherwise, the shell 74 presents a first, or upper, end 84 through which one has access to a first implanting area 86 on the floral foam mass 80 within which to insert those portions of the stems 88 from which the buds, blossoms and/or leaves (collectively 90) emanate. The second, or lower, open end 92 of the shell 74 also permits access to a second implanting area 94 on the floral foam mass 80 contained within the shell 74 that is likewise intended primarily to receive a plurality of typically bare stem portions 96.

As should now have been observed by comparing the structural configurations of the various alternative embodiments of the holders disclosed in the several figures, the general shape and sizes do not affect the functionality of the present invention. What the present invention provides that the prior art does not are the dual implanting areas that are located at axially opposite ends of the holder such that a satisfactory bouquet that simulates a sheaf of fresh cut flowers may be provided which obviates the primary negative aspect of heretofore known sheaf bouquets.

While only a preferred embodiment and three variations of our present invention are disclosed, it is to be clearly understood that the same is susceptible to numerous further changes apparent to one skilled in the art. Therefore, the scope of the present invention is not to be limited to the details shown and described but is intended to include all changes and modifications which come within the scope of the appended claims.

As should now be apparent, the present invention not only teaches that a floral holder embodying the concepts of the present invention is capable of permitting the simulation of a floral sheaf in which the apparent long stem flower stems are unsupported at their distal ends and yet a fluid reservoir is provided for the buds, blossoms, leaves and/or other greenery included in the bouquet. Moreover, the other objects of the invention, including a unique method for making such a floral bouquet, are likewise accomplished.

We claim:

1. A transportable floral bouquet holder comprising:

a moisture impervious shell having a first open end and a second open end;

a foam mass having a first foam end and a second foam end;

said first foam end substantially filling said first open end;

said second foam end substantially filling said second open end;

said first foam end presenting an implanting area primarily for receiving floral stems to which the buds, blossoms and/or leaves remain attached; and, said second foam end presenting an implanting area primarily for receiving bare cut stems.

2. The transportable floral bouquet holder, as set forth in claim 1, wherein:

said foam mass and said shell have substantially equal height measurements.

3. The transportable floral bouquet holder, as set forth in claim 1, wherein:

said shell portion presents an exterior surface that is substantially cylindrical.

4. The transportable floral bouquet holder, as set forth in claim 1, wherein:

said shell portion presents an exterior surface that is substantially frusto-conical.

5. The transportable floral bouquet holder, as set forth in claim 1, wherein:

said shell portion presents an exterior surface that is multi-faceted.

6. A transportable floral bouquet holder comprising:

a substantially frusto-conical moisture impervious shell having a first open end and a second open end wherein said second open end has an area smaller than said first open end;

a substantially frusto-conical foam mass having a first foam end and a second foam end;

said first foam end substantially filling said first open end;

said second foam end substantially filling said second open end;

said first foam end presenting an implanting area primarily for receiving individual flower components of a floral arrangement; and, said second foam end presenting a stem implanting area primarily for receiving individual stem components of the floral arrangement.

7. A transportable floral bouquet holder comprising:

a multi-sided moisture impervious shell having a first open end and a second open end wherein said second open end has an area smaller than said first open end;

a multi-sided foam mass having a first foam end and a second foam end;

said first foam end substantially filling said first open end;

said second foam end substantially filling said second open end;

said first foam end presenting a flower implanting area for receiving individual flower components of a floral arrangement; and, said second foam end presenting a stem implanting area for receiving individual stem components of the floral arrangement.

8. A method of manufacture for a floral bouquet comprising the steps of:

providing a floral bouquet holder having a moisture impervious shell, an inner moisture carrying foam mass, a first implanting area and a second implanting area;

implanting primarily that portion of the stems of a floral bouquet to which the buds, blossom and leave portions of flowers are attached in the first implanting area; and, implanting primarily that portion of the floral bouquet including the generally bare flower stems in the second implanting area.

9. The method, as set forth in claim 8, comprising the further step of:

decorating the shell with at least one ribbon and bow.

10. A method of manufacture for a floral bouquet comprising the steps of:

providing a floral bouquet holder having a moisture impervious shell with a top opening and a bottom opening;

inserting an moisture carrying foam mass into said shell to present a top implanting area at the top opening and a bottom implanting area at the bottom opening;

wetting said foam mass with a floral sustenance liquid such that said foam mass serves as a fluid reservoir;

implanting primarily that portion of a floral bouquet including the buds, blossoms and/or the leaf portions of flowers in the first implanting area; and, implanting primarily that portion of the floral bouquet including generally bare flower stems in the second implanting area.

11. The method, as set forth in claim 10, comprising the further step of:

decorating the shell with at least one ribbon and bow.

* * * * *

UNITED STATES PATENT AND TRADEMARK OFFICE
CERTIFICATE OF CORRECTION

PATENT NO. : 5,927,002
DATED : July 27, 1999
INVENTOR(S) : Charles F. Walton and Rene Silva It is certified that error appears in the above-identified patent and that said Letters Patent is hereby corrected as shown below:

Claim 1,
Line 50, after the word "stem" insert -- ; wherein said first and second open ends of said shell are substantially larger than a single floral stem or a bare cut stem. --

Claim 6,
Line 16, after the word "arrangement" insert -- ; wherein said first and second open ends of said shell are substantially larger than a single individual flower component or an individual stem component. --

Claim 7,
Line 31, after the word "arrangement" insert -- ; wherein said first and second open ends of said shell are substantially larger than a single individual flower component or an individual stem component. --

Claim 8,
Line 10, after the word "area" insert -- ; wherein said first and second implanting areas of said holder are substantially larger than the individual stems of a floral bouquet or individual bare flower stems. --

Claim 10,
Line 27, after the word "portion" insert -- of the stems --.
Line 29, after the word "area" insert -- ; wherein said top and bottom openings of said shell are substantially larger than the individual stems of a floral bouquet or individual bare flower stems. --

Signed and Sealed this

Twenty-fifth Day of September, 2001

*Attest:*

NICHOLAS P. GODICI
*Attesting Officer*     Acting Director of the United States Patent and Trademark Office